INVENTOR.
CECIL K. STEDMAN
BY Mathis and Graybeal
ATTORNEYS

INVENTOR.
CECIL K. STEDMAN

BY
Mathis and Stanbeal
ATTORNEYS

INVENTOR.
CECIL K. STEDMAN

BY
Mathis and Hoagland
ATTORNEYS

INVENTOR.
CECIL K. STEDMAN

BY
Mathis and Hraybal
ATTORNEYS

INVENTOR.
CECIL K. STEDMAN
BY
Mathis and Graybeal
ATTORNEYS

United States Patent Office

Re. 25,924
Reissued Dec. 7, 1965

25,924

PRESSURE SENSITIVE DIAPHRAGMS WITH STRESS NULL ZONE ORIENTED BRIDGE PATTERNS

Cecil K. Stedman, Enumclaw, Wash., assignor to Statham Instruments, Inc., Los Angeles, Calif., a corporation of California Original No. 3,071,745, dated Jan. 1, 1963, Ser. No. 134,070, Aug. 25, 1961. Application for reissue Oct. 22, 1964, Ser. No. 420,470
51 Claims. (Cl. 338—2)

Matter enclosed in heavy brackets [ ] appears in the original patent but forms no part of this reissue specification; matter printed in italics indicates the additions made by reissue.

The present invention relates to pressure sensitive assemblies, also known as transducers, of the type in which the transduction means comprises a bridge pattern in the form of an integral film or the like bonded to a flexible diaphragm, with strain sensitive change in electrical resistance of the active segments of the bridge pattern providing an indication of magnitude of pressure exerted on the diaphragm.

More particularly, the present invention relates to pressure responsive transducer assembles employing a flexible diaphragm having thereon a bonded bridge pattern in the form of an integral film or the like; wherein the bridge pattern comprises a plurality of active segments interconnected at juncture areas in turn having relatively low resistance conductor segments extending beyond the restrained edge of the diaphragm, the arrangement of said pattern being such that each of said juncture areas lies substantially in the radial stress null zone of the diaphragm, with one active segment connected to each juncture area disposed near-center from said null zone and with the other active segment connected to said juncture area disposed near-edge from said null zone, and wherein such near-edge active segment is advantageously disposed so that a major part thereof is in the area of and [outside] *near-edge with respect to* the tangential stress null zone of said diaphragm. In certain preferred forms of the bridge pattern the active segments thereof are composed of an electroconductive material having a substantial transverse gage factor ($G_t$), and the active segments are oriented to advantageously utilize such transverse gage factor and thereby increase bridge sensitivity, the arrangement of such near-edge active segment being with a substantial part thereof disposed outside of the tangential stress null zone of the diaphragm and extending parallel to the restrained edge thereof, so that the bridge material in substantial part responds to radial stress in relation to its transverse gage factor and in susbtantial part responds to tangential stress in relation to its parallel gage factor with such responses augmenting each other.

In certain of its aspects, other advantages and characteristics of the invention pertain to simple, durable and reliable arrangements of the bridge pattern to integrally include conductor film or like segments in turn having conductor output leads connected thereto, the pressure sensitive diaphragm of the assembly having a backing plate bonded thereto near the edge of the diaphragm, the conductor segments extending from the active segments to annularly oriented positions externally of the backing plate, such conductor output leads being attached as by soldering to the conductor segments, with the junctions being encapsulated in means bonding the diaphragm and backing plate together.

Other aspects of the present invention involve the presentation of several modified forms and variations of bridge patterns characteristic of the invention, and techniques for fabricating the bridge films, as well as techniques for assemblies transducer assemblies comprising such bridge films. Specific aspects of the invention also pertain to suitable electroconductive materials and suitable orientation of active bridge segments on a diaphragm in order to realize to greatest advantage the increase in sensitivity resulting from the transverse gage factors characteristic of certain materials.

As used herein, the terms "active segments" and "active film segments" refer to those portions of the bridge film pattern comprising the so-called arms or legs of an electrical bridge, which reflect substantial change in electrical resistance responsive to change in stress, i.e. those segments which are resistively active in performing the measuring function of the device. By the terms "conductor segments" and "conductor film segments" are meant those relatively low resistance segments of the bridge pattern connectively associated with the active segments internally of the assembly and terminating externally of the diaphragm, serving as input and output connection points or juncture areas for the active segments. By the terms "conductor output leads" and "output leads" are meant the wire or like means connected to such conductor film segments externally of the diaphragm and lead externally of the assembly, by means of which leads the voltage input and variable output of the active segments are electrically transmitted to externally associated measuring equipemnt.

By the term "parallel gage factor," or "$G_p$," is meant the sensitivity of the film or like material to change in electrical resistance resulting from the stress or component stress exerted parallel to or in the direction of current flow. By the term "transverse gage factor," or "$G_t$," is meant the sensitivity of the bridge material to change in electrical resistance resulting from the stress or component of stress exerted perpendicularly or transversely to the direction of current flow.

By the term "radial stress null zone" is meant the annular zone of the diaphragm in which no substantial radial stress occurs upon flexure of the diaphragm, i.e. the zone wherein the factor *r/a minus the factor*

$$\left[\frac{m+1}{3m+1}\right]^{1/2}$$

substantially equals zero. By the term "tangential stress null zone" is meant the annular zone of the diaphragm wherein no substantial tangential stress occurs upon flexure of the diaphragm, i.e. the zone wherein the factor *r/a minus the factor*

$$\left[\frac{m+1}{m+3}\right]^{1/2}$$

substantially equals zero.

By the term "film or the like," as applied to the form of brideg pattern material, is meant material in the form of a thin sheet of uniform thickness dimension throughout, which thickness dimension is less by several orders of magnitude than the dimension of the diaphragm. By the terms "integral film" and "integrally formed film," are meant a film of homogeneous nature throughout, comprising no soldered or like discrete connection of separately formed segments.

As is known, when an edge restrained flexible diaphragm is subjected to differential pressure at the faces, the diaphragm is loaded to be in compression in certain areas and directions and to be in tension in other areas and directions. Compound stresses occur such that portions of the diaphragm are under substantial radial and/or tangential tensile stress and other portions of the diaphragm are under substantial radial and/or tangential compression stress. By the terms "radial stress" or "$S_r$," and "relative radial stress," or "$S'_r$," are meant the physical stresses exerted on the diaphragm and bridge pattern which are exerted in a direction radially of the center of the diaphragm. By the term "tangential stress," or "$S_t$," and "relative tangential stress," or "$S'_t$" are meant stresses exerted in a direction parallel to the restrained edge of the diaphragm. Considering the stresses as they occur in relation to the center and restrained edge of the diaphragm, a given condition of loading and diaphragm flexure causes either compression or tension stress relatively near the center of the diaphragm and either tension or compression stress relatively near the edge of the diaphragm, depending up the direction of flexure. The hereinafter discussed considerations, as to the relation of stresses exerted in various regions of the diaphragm expressed in terms of the distance/radius ("r/a") ratio, [assuming] *assume* for simplicity that the direction of flexure is toward the side of the diaphragm on which the bridge film pattern is arranged, i.e. [assuming] *assume* the condition where the bridge in its near-center regions is under tension and in its near-edge regions is under compression, with the tensile stresses being denoted "negative" and the compression stresses being denoted "positive." However, as will be apparent, the principles here involved are equally applicable to the converse situation where the bridge in its near-center regions is under compression and in its near-edge regions is under tension, in which situation the stress factors (as in FIG. 1) are of the same absolute value but of opposite sign.

Giving due consideration to bridge pattern designs which optimally utilize both radial and transverse types of stresses, and also utilize both the parallel gage factor and transverse gage factor of certain electroconductive materials in order to attain optimum bridge sensitivity, minimize heating effects, and preferably provide that the bridge is internally self-balancing, are basic objects and features of the invention.

The bridge segments are integrally formed as by vapor deposition, to be the same composition and thickness throughout so that all portions thereof have the same responsiveness to temperature changes and to aging. Preferably, each active bridge segment has about the same length/width ratio as the other active segment or segments, to be internally balanced with electrically equal bridge arms. Also, each active film segment has a substantial area and is as long as practicable, consistent with other design factors, in order that the heat generated in the segment be dissipated over a substantial area. At least two and preferably four active segments are employed, one segment or opposed pair of segments being relatively near the center of the diaphragm and the other segment or opposed pair of segments being relatively close to the restrained edge of the diaphragm so that one segment or pair is under compression while the other segment or pair is under tension. However, use of four active segments is preferable for maximum sensitivity, with one opposed pair positioned on tensioned regions of the diaphragm and the other opposed pair positioned in compressed regions of the diaphragm, so as to provide a line pattern in the form of a "loop" in which all the segments electrically augment each other when connected as a Wheatstone bridge. In such an arrangement involving four active film segments, the segments are quadrantly related, with one opposite pair of the segments disposed symmetrically of each other so as to be subjected to substantially the same stresses, while the other opposite pair is likewise symmetrically oriented with respect to each other so as to be also subjected to substantially the same stresses. In order to minimize internal heating effects, and consistent with the foregoing considerations, it is another characteristic of the film bridge patterns of the present invention that the active segments are each spread over a substantial area (i.e. as a film), yet are spaced a substantial distance from each other.

In preferred forms of the bridge film pattern as herein disclosed, the arrangement of active segments comprises two oppositely disposed active segments situated near the center of the diaphragm and two oppositely disposed active segments situated near the restrained edge of the diaphragm, in conjunction with integrally formed, relatively low resistance conductor segments, all of similar configuration and orientation on the diaphragm. This is accomplished most practicably by making the active segments and conductor segments of the same material and same thickness. This integration of the conductor segments with the active segment serves the advantage of eliminating any necessity for separate output lead connections within the restrained edge of the diaphragm, with consequent constructional simplification. Such constructional simplification also avoids the problem of internal connections being a limiting factor in the minimum size capability of the transducer. The integration of active and conductor segments also avoids the sometimes troublesome problem of bridge balance variations caused by the presence of soldered connections at the bridge arm terminals.

Two opposed conductor segments serve to transmit the voltage input to the bridge loop, and the other two opposed conductor segments serve to transmit the bridge output voltage or signal to the output leads.

Still other features and advantages characteristic of the present invention include the utilization of a bridge film pattern formed to include integral, low resistance conductor segments extending to the periphery of the diaphragm, with the film conductor segments bonded to the diaphragm and with the backing plate also bonded to the diaphragm, and with the bonding means between the periphrey of the diaphragm and the outer portion of the backing plate serving to encapsulate lead connections to said conductor film segments, such manner of construction and assembly providing that the assembly is constructionally rugged and electrically insulated.

The bridge pattern mounting diaphragm is preferably but not necessarily circular in form, and is edge restrained as by the clamping action of a backing plate bonded to the diaphragm. In the simplest case, a circular diaphragm is clamped near its periphery and uniformly loaded across the diaphragm, as in the diaphragm of a pressure gage, for example. The reverse or obverse surfaces of the diaphragm, or both surfaces, can carry a bridge film pattern bonded thereon. When the diaphragm is of itself electrically conductive, as when formed from metal, such is insulated from the bridge film pattern by providing an insulating layer of bonding material therebetween. However, the diaphragm may of itself be an insulating material, such as silica, in which event the bridge pattern can be bonded directly to the diaphragm and the segments insulated from each other by the diaphragm.

In order to more full describe certain features and advantages of the invention, consideration will be given to the gage factors of the film material and to the relationship between the gage factors and bridge output, i.e. bridge sensivity.

The gage factor G of an electroconductive material is defined as the ratio of the fractional change of resistance $$\frac{\Delta R}{R}$$

and the fractional elongation $$\frac{\Delta l}{l}$$

i.e.

$$G=\frac{\Delta R}{R}\Big/\frac{\Delta l}{l}$$

The output voltage $\Delta V$ expressed as a fraction $$\frac{\Delta V}{V}$$

of the applied voltage V depends upon the combined $$\frac{\Delta R}{R}$$

of the bridge arms; specifically $$\frac{\Delta V}{V}$$

equals one-quarter of the sum of the values of $$\frac{\Delta R}{R}$$

for the four bridge arms.

The potential across the output depends on the potential established across the input, and it is thus desirable that the active film segments composing the bridge be of sufficiently high resistance to permit application of a relatively high potential across the input of the bridge without excessive current flow. In typical examples, the resistance R of each active film segment of the bridge is about 100–2000 ohms.

The value of the gage factor G as defined by the above equation is different [if] *when* the direction of current flow is parallel to the strain $\Delta l/l$ than when the elongation is exerted in a direction perpendicular to, i.e. transverse to, the direction of current flow. In other words, rather than a single gage factor G, there are actually two gage factors involved. These gage factors may be represented by the symbols $G_p$ and $G_t$. As will be apparent, in the situation where a bridge arm is subjected to strain in directions both parallel and perpendicular to the direction of current flow, then the resulting $$\frac{\Delta R}{R}$$

is the sum of the values that would result from either strain acting separately. Recognition of this distinction between the two gage factors $G_p$ and $G_t$ is important because electroconductive materials vary considerably as to the values of $G_p$ and $G_t$, and unless the relative contributions thereof are taken into account in orienting the active film segments in relation to the radial and tangential stresses, less than full utilization of the internal change in resistivity and loss in overall sensitivity of the bridge result. The signficance of the interrelation of the radial and tangential stresses and the parallel and transverse gage factors $G_p$ and $G_t$ are developed more specifically hereinafter.

In order to obtain a maximum output per volt input to the bridge, it is desirable to maximize the valve of $$\frac{\Delta R}{R}$$

for each segment. Studies incident to the present invention indicate that the value of $$\frac{\Delta R}{R}$$

is dependent upon the r/a position and direction of the segments on the diaphragm and also upon the gage factors $G_p$ and $G_t$, as above indicated. These parameters influence the pattern of the arrangement of the bridge segments in the ideal case. However, at least for small diaphragms, where the segments are relatively close together, it is often necessary to compromise between the desired to minimize heating effects of the bridge current and the desired to maximize the valve of $$\frac{\Delta V}{R}$$

of each bridge segment.

The above objects and features incident to the development of transducer assemblies and particularly the development of bridge patterns therein with optimal utilization of both parallel and transverse gage factors, as well as minimization of heating effects, and as well as internally self-balanced bridge networks, will be apparent from the following description, together with the accompanying drawings, wherein like numerals refer to like parts, and wherein.

In order to realize the basic principles and advantages of the invention, an analysis of the forces exerted upon the active film segments and the changes in resistance resulting from such forces is next presented.

In the following analysis, the diaphragm is assumed to be circular, edge restrained and loaded uniformly across its face to generate compressive and tensile stresses across the face of the diaphragm. In this respect, and while the following discussion refers to simultaneously occurring compression in certain regions while tension occurs in other regions, it will be understood that loading of the diaphragmn in the reverse direction is governed by the same principles, except that in such reverse condition the areas of tension become areas of compression and the areas of compression become areas of tension.

With the uniform loading of the diaphragm within the range of magnitude such that all parts of the diaphragm are displaced linearly, i.e. in direct proportion to the applied load, the distribution of stresses on the diaphragm is given by the following equations:

$$S_r=\frac{3W}{8\pi mt^2}\left[(3m+1)\frac{r^2}{a^2}-(m+1)\right] \qquad (1)$$

and $$S_t=\frac{3W}{8\pi mt^2}\left[(m+3)\frac{r^2}{a^2}-(m+1)\right] \qquad (2)$$

where $S_r$ is the radial stress at any point at a distance r measured along the radius a from the center; $S_t$ is the tangential stress, i.e., the stress perpendicular to the radius at the above point; W is the load; t is the thickness of the diaphragm; a is the radius of the diaphragm to the clamped edge; and m is the reciprocal of Poisson's ratio (1/m) for the material of the diaphragm.

For the value within the brackets in Equation 1, we may write $S'_r$, and for the value of the bracket in Equation 2 we may write $S'_t$. The following table gives the values of $S'_r$ and $S'_t$ for various values of r/a where r is the radial position along a radius a at which the stresses are evaluated. The table gives the values of $S'_r$ and $S'_t$ for a silica diaphragm having an m value of 7.15 and a metallic diaphragm having an m value of 3.3, "m" being the inverse of the Poisson ratio.

| r/a | m=7.15 | | m=3.3 | |
|---|---|---|---|---|
| | $S'_r$ | $S'_t$ | $S'_r$ | $S'_t$ |
| 0 | −8.15 | −8.15 | −4.3 | −4.3 |
| 0.1 | −7.93 | −8.05 | −4.2 | −4.29 |
| 0.2 | −7.25 | −7.74 | −3.9 | −4.12 |
| 0.3 | −6.13 | −7.24 | −3.3 | −3.9 |
| 0.4 | −4.56 | −6.53 | −2.5 | −3.6 |
| 0.5 | −2.54 | −5.61 | −1.5 | −3.3 |
| 0.6 | −0.7 | −4.50 | −0.3 | −2.7 |
| 0.7 | +2.85 | −3.18 | +1.1 | −2.2 |
| 0.8 | +6.22 | −1.65 | +2.7 | −1.5 |
| 0.9 | +10.03 | +0.07 | +4.6 | +0.8 |
| 1.0 | +14.30 | +2.00 | +6.7 | +2 |

The [positive] *negative* sign indicates that the stress is a tensile stress, and the [negative] *positive* sign that the stress is a compressive stress.

Figure 1:
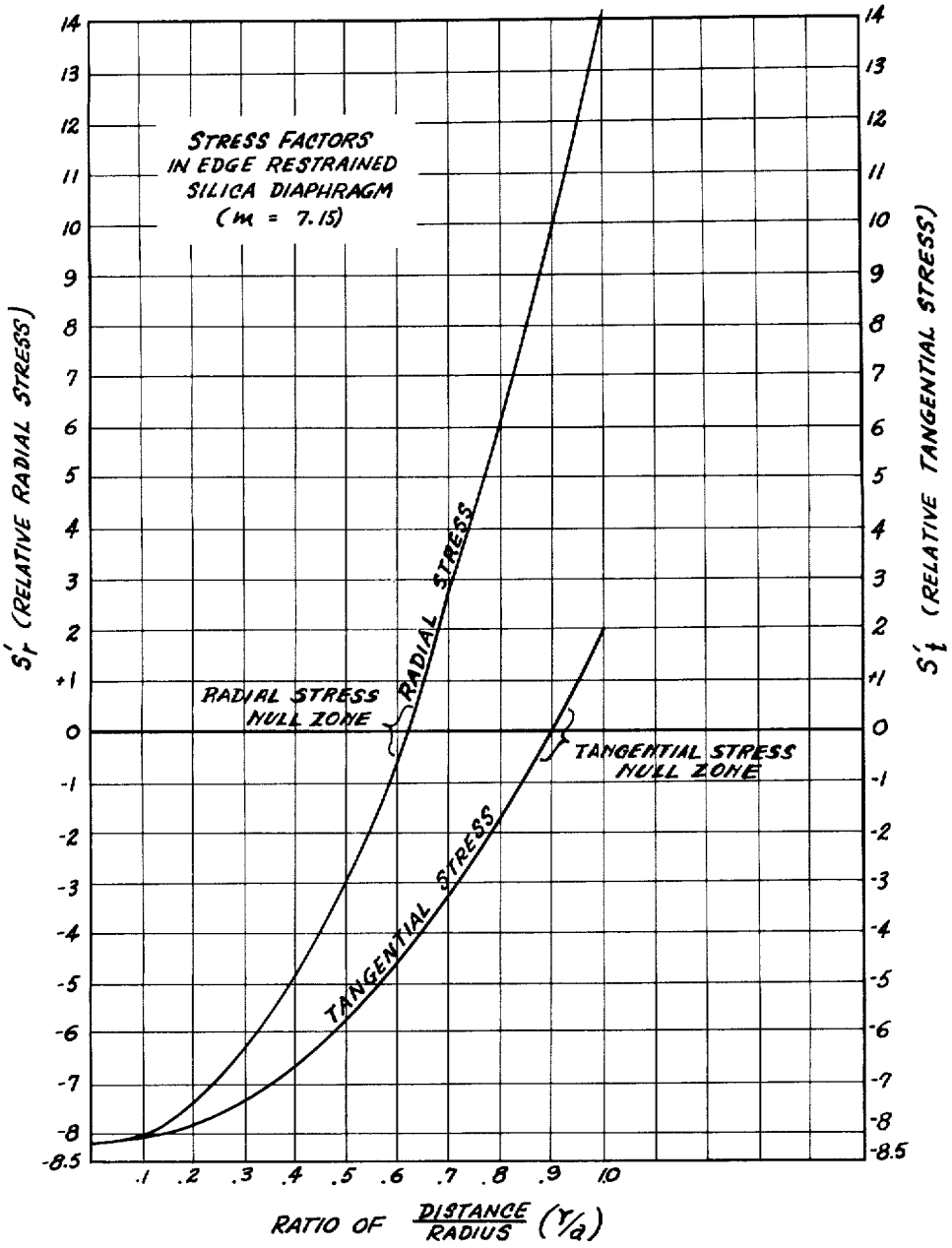
FIG. 1 is a graphical presentation of the distribution of radial and tangential stresses occurring in a typical edge restained circular diaphragm under uniform loading, which graphical presentation serves to show some of the governing principles and consideration as to locating the active film segments on a diaphragm in accordance with the present invention.

Values for a silica diaphragm from the above table are plotted on FIG. 1, in which the upper plot (designated "radial stress") indicates the values of $S'_r$ for a silica diaphragm of m value of about 7.1 and the lower curve (designated "tangential stress,") indicates the value of $S'_t$ for the same diaphragm as a function of the distance-from-center ("r/a") at which the stresses are evaluated.

The values presented by FIG. 1 are indicative of the actual stresses in any diaphragm because the factor $$\frac{3W}{8\pi mt^2}$$

has a constant value K for any given diaphragm. Also, with diaphragms of various sizes and materials, the factor K has a different magnitude but the shapes of the curves corresponding to those of FIG. 1 change very little, i.e. the radial stress null zone and tangential stress null zone occur in all instances at r/a values of about 0.6 and about 0.9, respectively, regardless of the diaphragm size and diaphragm material.

For any value of K the radial stress becomes zero at a value of r such that $$\frac{r}{a}=\left[\frac{(m+1)}{(3m+1)}\right]^{1/2} \quad (3)$$

The radical stress is positive in [tension] *compression*, i.e., when $$\frac{r}{a}>\left[\frac{(m+1)}{(3m+1)}\right]^{1/2} \quad (4)$$

and it is negative in [compression] *tension*, i.e. when $$\frac{r}{a}<\left[\frac{(m+1)}{(3m+1)}\right]^{1/2} \quad (5)$$

The tangential stress is zero when $$\frac{r}{a}=\left[\frac{(m+1)}{(m+3)}\right]^{1/2} \quad (6)$$

and the tangential stress is positive, i.e., in [tension] *compression*, when $$\frac{r}{a}>\left[\frac{(m+1)}{(m+3)}\right]^{1/2} \quad (7)$$

and the tangential stress is negative, i.e., in [compression] *tension*, when $$\frac{r}{a}<\left[\frac{(m+1)}{(m+3)}\right]^{1/2} \quad (8)$$

In order to utilize the different magnitude of stress occurring in different regions of the diagram to obtain optimum sensitivity, regions of the diaphragm are selected for adjacent active segments of the bridge which provide stress factors of opposite sign, i.e. where one segment of the bridge is stressed in tension, a region is chosen for the one or more active segments connected to it which is stressed in compression. Thus, for example, one active segment is positioned as close to the restrained edge of the diaphragm as practicable (i.e. "near-edge" of the diaphragm), and the active segment or segments connected to it are positioned so as to be as close to the center of the diaphragm as practicable (i.e. "near-center" of the diaphragm).

For reasons which will appear from the graphical presentation of FIG. 1, the active segments are most advantageously comprised of a material having a substantial transverse gage factor $G_t$ as well as a parallel gage factor $G_p$, and at least one of the active film segments is located to take advantage of the tangential gage factor. Thus, for example, those active segments which lie relatively close to the restrained edge of the diaphragm are oriented so that preferably at least about 20% of the total change in the resistivity of the segments occurs as a result of the relatively large radial stress in this area across the segment (noting the radial stress curve of FIG. 1 at values of r/a approaching 1.0) which radial stress is responded to in a manner at least primarily determined by the transverse gage factor $G_t$ of the segment. In other words, in certain of the bridge pattern designs here presented, the active segment or segments which lie near the restrained edge of the diaphragm have a configuration so that a considerable and preferably predominant portion of their length extends tangentially of, i.e. parallel to, the restrained edge. By this arrangement, the non-opposing tangential stress near the restrained edge is utilized, as well as the change in resistance reflected by the high radial stress. Also, the bridge pattern is considerably simplified to the extent that the effective length of the near-edge segment or segments of a bridge pattern can readily be of about the same overall length as the near-center segment or segments thereof, with the no-strain resistance (R) of the bridge pattern segments being substantially equal. It is important to be able to keep the near-edge bridge segments relatively short in bridge pattern design, in that if unduly long such near-edge segment or segments must be arranged with a multiplicity of reverse bends and must have segment portions positioned relatively closely to one another, with adverse heating effects.

With respect to the near-center segment or segments of a bridge pattern, it will be noted from FIG. 1, that the magnitude of the tangential stress and the magnitude of the radial stress are much more similar being substantially equal at the center of the diaphragm, with the tangential stress however being substantially greater in the region extending from near-center to the radial stress null zone. For this reason, it has also been found advantageous to orient the near-center segment or segments to extend substantially parallel to the restrained edge, but not critically so, in which location the parallel gage factor of the film material responds to the tangential stress and the transverse gage factor of the material responds to the radial stress when the film material has a substantial transverse gage factor.

The closer a near-edge active segment is to the restrained edge of the diaphragm, the higher will be the value of the radial and tangential stresses. However, practically speaking, a near-edge segment can include portions which have a radial or chordal as well as tangential orientation, to increase the overall length and area of the segment and thus reduce localized heating. On the other hand, for the near-center segment or segments, the closer such are located to the center of the diaphragm, the greater the value of the radial and tangential stresses. However, heating effects and the desirability of having the near-center segments of about the same length/width ratio as the near-edge segments introduce compromise considerations so that as a practical matter the near-center segments are placed in the region where r/a values are about 0.35 to 0.6. As earlier indicated, it is desirable to not only attain a maximizing of the value $$\frac{\Delta R}{R}$$

but also to obtain active film segments of sufficient area to distribute the heating effect. Accordingly, selection of the segment orientations, whether radial, arcuate, chordal, or combinations thereof, will depend upon the $G_p$ and $G_t$ gage factors of the material, the overall length of the segments desired, the placement of segments to minimize heating, and the contribution of the r/a placement as reflected by the comparative tangential stress and radial stress involved.

In the specific bridge patterns herein disclosed, both of the near-edge segments are of relatively the same configuration and are symmetrically spaced about the diaphragm center. Similarly, the near-center segments are in turn of the same configuration relative to one another and are symmetrically spaced from the center.

Figure 2:
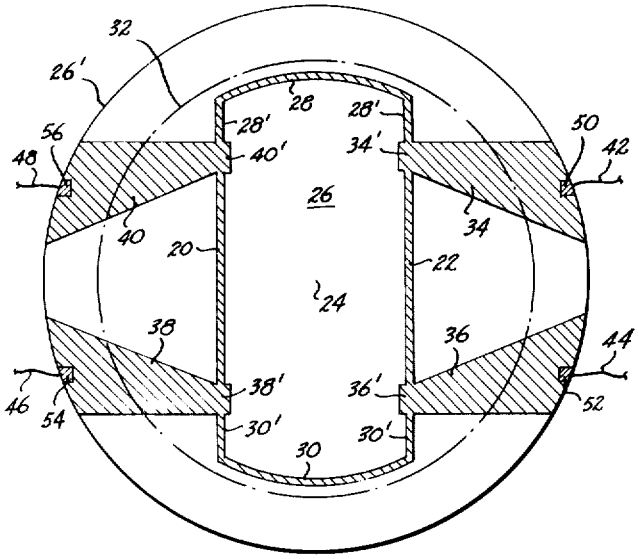
FIG. 2 is a plan view of the exposed face of a typical bridge pattern according to the present invention, showing its orientation with respect to the diaphragm on which it is bonded.

The film bridge pattern shown in FIG. 2 comprises an opposed pair of active film segments 20 and 22, of equal length and width, and symmetrically spaced from the center 24 of the diaphragm 26 in a chordal near-center disposition. The active film segments of the bridge pattern shown in FIG. 2 also comprise a second opposed pair of segments 28 and 30 which are primarily arcuate and situated in near-edge disposition, i.e. adjacent to the clamped or restrained edge of diaphragm 26, the clamp line being indicated in FIG. 1 at 32. The junction of the respective pairs of opposed bridge film segments 20, 22, 28 and 30 are joined by output connector segments 34, 36, 38 and 40 which extend from the respective juncture areas 34', 36', 38' and 40' to the peripheral edge 26' of the diaphragm in each instance, and are integrally formed with but considerably wider in dimension than the active film segments 20, 22, 28, 30 to provide relatively low resistance. Said output conductor segments 34, 36, 38, 40 in their peripheral portions are each soldered to a respective output lead 42, 44, 46 and 48, the respective solder area in each instance being indicated at 50, 52, 54 and 56.

Figure 3:
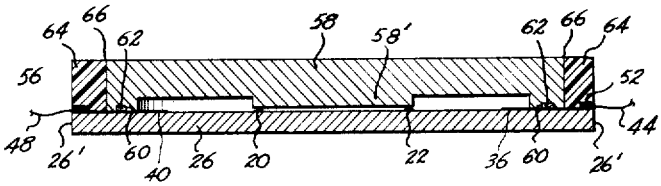
FIG. 3 is a view in diametric cross section through a transducer assembly employing a bridge pattern configuration such as shown at FIG. 2.

The clamped or restrained edge 32 of the diaphragm as illustrated at FIG. 2 is established by mounting of the diaphragm 26 on a backing plate 58 (FIG. 3) by means of an adhesive ring 60 providing a bond between the portions of the diaphragm lying under line 32 and an inset or groove 62 provided adjacent to the edge of said backing ring 58. As shown in FIG. 3, said backing plate 58 optionally includes a boss or stop portion 58' centrally contiguous of diaphragm 26, which stop portion 58' serves to limit the extent of movement of the diaphragm 26 and prevent accidental breakage thereof in the event of application of excessive pressure.

Bonding of the diaphragm 26 and backing plate 58 is preferably but not necessarily augmented by a ring of encapsulating resin 64 encircling backing plate 58 and adhering to it as well as the peripheral area of diaphragm 26 lying between the outer edge 66 of the backing plate 58 and the peripheral edge 26' of the diaphragm 26. Such outer bonding ring 64 encapsulates and effectively insulates as well as physically strengthens the respective connections 50, 52, 54 and 56 between respective output conductor segments 34, 36, 38, 40 and output leads 42, 44, 46, 48.

In the illustration of the diaphragm provided by FIG. 3 (and also in FIGS. 9–11 discussed below), the thickness dimension of the bridge film pattern is necessarily exaggerated for illustration purposes. In actuality, the thickness of the bridge film pattern in a typical transducer assembly is suitably on the order of 100 angstroms.

The bridge film pattern configuration shown at FIG. 2 is suitable for use where the film material has not only a substantial parallel gage factor $G_p$ but also a substantial transverse gage factor $G_t$, so as to permit the tangential stresses to make a significant contribution to the change in resistance of the active film segments. Active film segments 20, 22 are of relatively equal length, equally spaced about both sides but relatively near the center 24 of the diaphragm, while the active film segments 28, 30 are similarly of relatively equal length and lie close to the clamped edge 32 of the diaphragm.

Characteristic of the invention, the near-edge active film segments 28, 30 in the pattern shown at FIG. 2 are disposed to lie primarily quite near the clamped edge 32 of the diaphragm 26, and extend arcuately therealong except for relatively short chordal sections 28', 30' connecting the arcuate sections of segments 28 with juncture areas 34', 36', 38', 40'.

Relating the bridge pattern configuration shown at FIG. 2 to the stress relationships graphically presented at FIG. 1, it will be seen that the near-edge film segments 28, 30, including the short chordal portions 28', 30' thereof, are of a radial distance from the center 24 so that these segments lie entirely in regions of the diaphragm 26 where the r/a values are greater than $$\left[\frac{(m+1)}{(3m+1)}\right]^{1/2}$$

As shown by FIG. 1, this corresponds to values of r/a of greater than about 0.6, and the placement of said near-segments 28, 30 is such that such lie entirely in the area of diaphragm 26 where the r/a ratio is greater than about 0.6. More specifically, juncture areas 34', 36', 38', 40', are placed to fall at points where the value of r/a is about 0.7, and the arcuate sections of the segments 28 are placed so that the center lines thereof fall at an r/a value greater than about 0.9, e.g. a value of about 0.95. It will be seen from FIG. 1, that the radial stress factor in and outside of the tangential stress null zone is quite high and the tangential stress is either about zero or is of the same sign, i.e. augments or at least does not oppose the radial stress. With the disposition of such arcuate sections of segments 28, 30 to be parallel to the restrained edge 32, the parallel gage factor $G_p$ of the film material is related to the tangential stress, and the perpendicular gage factor $G_t$ of the material is related to the radial stress, with the $\Delta R$ sensitivity primarily responding in a manner determined by the $G_t$ of the film material. If the material making up the bridge pattern had no transverse gage factor $G_t$, it will be observed that very little change in resistance of film segments 28, 30 would occur in response to change in stress. By use of a material having a substantial transverse gage factor, however, and placement of at least the primary part of the active film segments 28, 30 near the restrained edge of the diaphragm, the high radial stress factor is utilized to good advantage, and tangential stress opposition or loss is also avoided so that optimal sensitivity results.

The near-center film segments 20, 22, in the bridge pattern shown in FIG. 2, lie along chords which are geometrically aligned with segment portions 28', 30'. With respect to the desired placement of said near-center segments 20, 22, the closer these are to center 24 of the diaphragm, the greater the negative value of $\Delta R/R$ (again note FIG. 1). However, it is also important to not place the near-center segments 20, 22 too near each other, because of adverse heating effects. For this reason, the near-center segments 20, 22 are placed to be not less than about an r/a value of about 0.35 distance from the center 24 of the diaphragm. With the chordal configuration of the near-center segments 20, 22, as shown at FIG. 2, such lie entirely within a region where the value of r/a is substantially less than $$\left[\frac{(m+1)}{(3m+1)}\right]^{1/2}$$

i.e. less than about 0.6. In this area, and again noting FIG. 1, it will be seen that the radial stress factor and tangential stress factor are both negative and therefore augment one another without certain portions of the segments introducing opposition or loss from the point of view of sensitivity to change in resistance resulting from changes in stress. Also, with respect to the configuration of said near-center segments 20, 22, it is to be observed from FIG. 1 that although the magnitude of the tangential stress is a greater negative value, the magnitude of both the tangential and radial stress are substantial so that while an optimum near-center segment configuration lies substantially parallel to the restrained edge 32 (noting the bridge patterns presented by FIGS. 5–8 in this respect) such is not necessarily the case; for example the chordal segment 20, 22 can provide adequate sensitivity to change in resistance.

Figure 4:
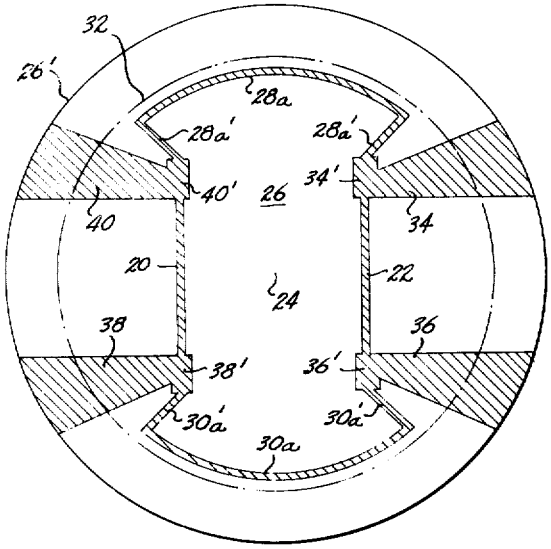
FIGS. 4, 5, 6, 7 and 8 are views similar to that of FIG. 2, illustrating modified forms of bridge patterns characteristic of the invention.

FIG. 4 illustrates a slightly modified variation of the bridge film pattern shown at FIG. 2, in which the chordal section 28a′, 30a′ of the near-edge segments 28a, 30a are directed radially of center 24 of the diaphragm 26. This configuration substantially increases the length of the arcuate portions of segments 28a, 30a, and also to some extent the length of radial portions 28a′, 30a′.

Figure 5:
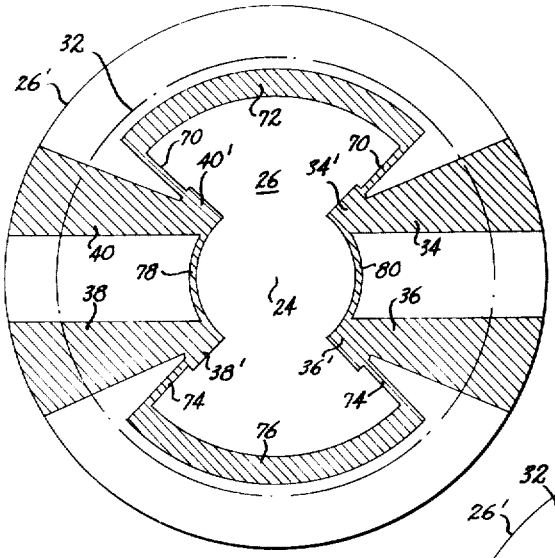

FIG. 5 illustrates a bridge pattern configuration in which the near-edge film segments are primarily radially directed, with each such film segment having two radially directed segment portions. As shown at FIG. 5, the upper near-edge film segment comprises radially directed segment portions 70 joined by a relatively low resistance connector portion 72, and the lower near-edge film segment comprises radially directed portions 74 joined by relatively low resistance connector portion 76. Also, in the bridge configuration shown at FIG. 5, the near-center segments 78, 80 are of arcuate configuration and because of their closer placement to center 24 of diaphragm 26 are shorter in length than the corresponding segments 20, 22 of the bridge configurations shown by FIGS. 2 and 4. The type of bridge film pattern shown in FIG. 5 has its juncture areas 34′, 36′, 38′, 40′ in the radial stress null zone of the diaphragm 26, and is particularly adapted for use of a bridge material having no substantial transverse gage factor, e.g. Nichrome, in that its near-edge segments are radially oriented to respond to the high radial stress in the near-edge region of the diaphragm. Also, where adequate sensitivity in resistance can be obtained by comparatively short segment lengths, the bridge configuration shown at FIG. 5 is advantageous from the point of view of the physical separation of each active film segment or segment portion from the others.

Figure 6:
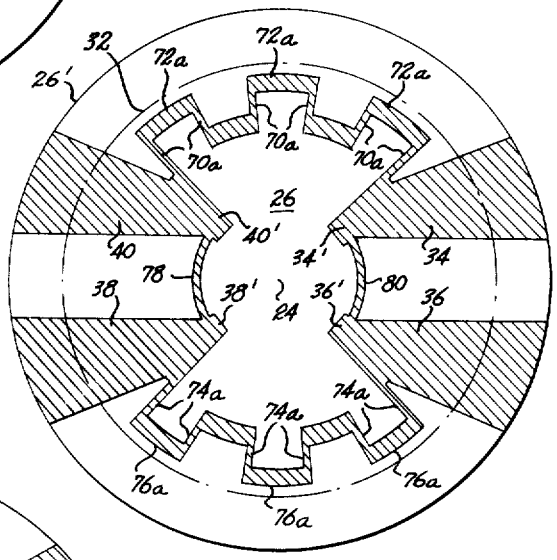

FIG. 6 is a variation of the bridge pattern shown by FIG.5, in which the near-edge active segments 70a and 74a are made shorter and increased in number, as compared with segment portions 70, 74 of FIG. 5, such segment portions 70a, 74a being respectively connected in series by means of relatively low resistance, arcuately extending connectors 72a and 76a. By this variations, the radially extending, near-edge segment portions 70a, 74a are increased in total effective length, if desired, while still retaining an orientation in the region of the diaphragm having an r/a value greater than about 0.6.

Figure 7:
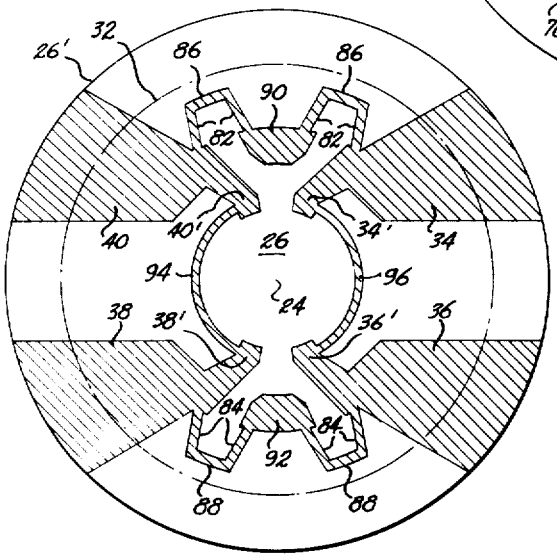

FIG. 7 illustrates yet another variation of bridge configuration characteristic of the invention, wherein each near-edge segment is formed of a plurality of respective segment portions 82 and 84 forming small acute angles with radii of the diaphragm, which chord segment portions 82, 84 are joined by respective short, arcuately extending segment portions 86 and 88 lying nearest the restrained edge of the diaphragm, and also joined by respective arcuately extending, relatively low resistance connectors 90 and 92 lying relatively near the respective juncture areas 34′, 40′ and 36′, 38′. Also, in keeping with the greater effective length of the near-edge bridge segments 82, 86 and 84, 88, the arcuately extending, near-center bridge segments 94 and 96 of the bridge configuration shown at FIG. 7 are comparatively longer than the corresponding near-center segments 78, 80 of the configurations shown at FIGS. 5 and 6.

Figure 8:
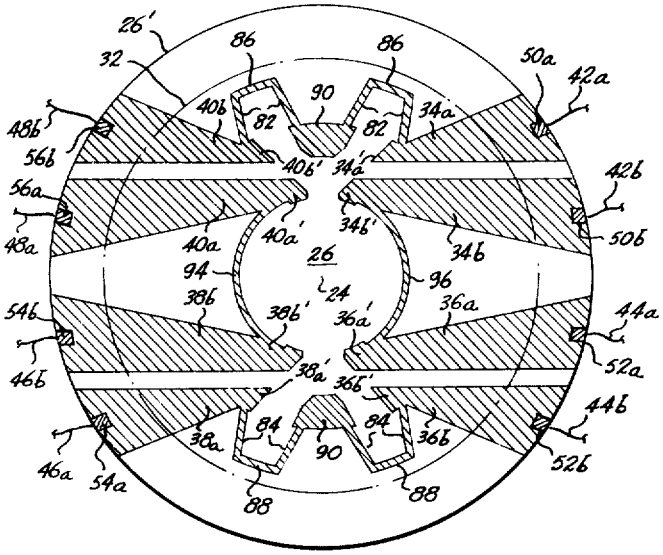

FIG. 8 serves to illustrate a further type of variation in bridge pattern configuration, wherein the juncture areas terminating the active film segments in the radial stress null zone are brought to the edge of the diaphragm separately. Selecting the configuration of active segments of the bridge pattern of FIG. 7 to serve to illustrate this type of variation, the bridge pattern shown at FIG. 8 splits the output conductor segments 34, 36, 38, 40 of the FIG. 7 configuration into respective output conductor segments 34a and 34b, 36a and 36b, 38a and 38b, and 40a and 40b. By this arrangement, the near-edge bridge segments 82, 86 connects only to juncture areas 34a′ and 40b′, near-edge bridge segment 84, 88 connects only to juncture areas 36b′ and 38a′, near-center bridge segment 94 connects only to juncture areas 38b′ and 40a′, and near-center bridge segments 96 connect only to juncture areas 34b′ and 36a′. To complete the output connections, and by analogy to the output connection of arrangement shown with respect to the bridge pattern of FIG. 2, the output conductor segments 34a, 34b, 36a, 36b, 38a, 38b, 40a and 40b are each soldered to respective output leads 42a, 42b, 44a, 44b, 46a, 46b, 48a and 48b, the respective solder area in each instance being indicated at 50a, 50b, 52a, 52b, 54a, 54b, 56a and 56b.

Should such be desired, the bridge configuration of FIG. 8 enables the use externally of the transducer of temperature compensating and trim resistors such as conventionally used in electrically balancing a Wheatstone bridge. While it is an advantage and preferable objective of the bridge configurations of the present invention to provide that such are internally resistively balanced, it will be understood that a degree of external balancing may at times be desired, and FIG. 8 serves to show in this respect that the bridge patterns of the invention readily have this capability.

Figure 9:
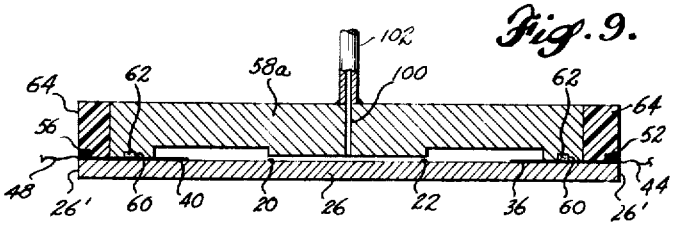
FIGS. 9, 10 and 11 are cross sectional views similar to the view of FIG. 3, showing further variations of transducer arrangements according to the invention.
Figure 10:
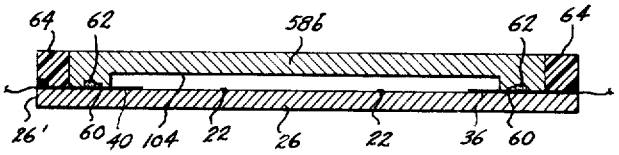
Figure 11:
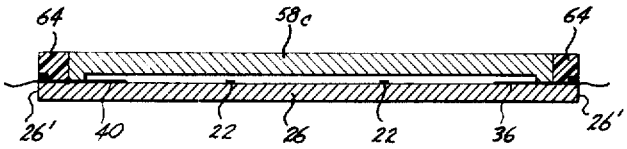

FIGS. 9, 10, and 11 illustrate certain typical variations with respect to the make-up of transducer assemblies comprising an edge restrained diaphragm 26, i.e. certain modifications of the transducer assembly earlier discussed with respect to FIG. 3. Thus, in FIG. 9, the diaphragm 26 with its film pattern 20, 22, 36, 40 can be bonded by adhesive ring 60 and encapsulating ring 64 to a relatively rigid backing plate 58a having a centrally provided bore 100 in communication with pressure tube 102, by means of which fluid of a pressure to be measured is introduced into the interspace between diaphragm 26 and backing plate 58a. With such arrangement, the transducer becomes a differential pressure gage, sensitive to the difference in pressures established between the innerface and outerface of the diaphragm 26.

The transducer construction shown at FIG. 10 shows another variation in backing plate detail, its backing plate 58b being cut away along an inner surface 104 to provide a larger internal chamber between diaphragm 26 and the backing plate 58b and permit greater flexural displacement of said diaphragm 26.

FIG. 11 illustrates a further variation as to backing plate configuration of a transducer assembly comprising a diaphragm 26, wherein the backing plate 58c is attached to diaphragm 26 by the encapsulating ring 64, and wherein the backing plate 58c is of a thickness substantially equal to the thickness of diaphragm 26. As will be understood, the forms of backing plates 58b and 58c as shown at FIGS. 10 and 11, being of substantially equal thickness as diaphragm 26, are of themselves flexed materially under pressure and will therefore augment the pressure responsiveness of the diaphragm 26. It is oftentimes quite practical to make the diaphragm and backing plate of the same material and thickness, so as to have substantially similar flexural characteristics in both.

The diaphragm can be of metal, such as steel, or can be of non-metallic material, such as quartz, fused silica, glass, plastic or ceramic material, and the backing plate likewise can be of any suitable metallic or non-metallic material with strength properties comparable to or greater than those of the diaphragm.

A highly useful application of the invention is in connection with miniaturized transducers, with the bridge film pattern applied to a diaphragm of insulating material, preferably silica. The silica diaphragm is considered particularly advantageous by virtue of its inherently good temperature stability and good physical characteristics, with low mechanical hysteresis, with small variation of modulus of elasticity which change in temperature, and with a low coefficient of expansion.

With respect to the bridge pattern, such is bonded on the surface of the diaphragm either by glue or other insulating bonding agent, in the case of metallic diaphragms, or directly on the diaphragm, in the case of electrically non-conductive diaphragm materials. The deposition of the bridge film material on the diaphragm or, on an insulating layer bonding same to the diaphragm, can be by any of several well-known techniques, and the bridge pattern can be developed by any of several well-known circuit methods as, for example, by painting, drawing, silk-screening and photo-engraving. Various techniques for such purpose have been developed, as indicated; see, for example, National Bureau of Standards Circular 468, entitled Printed Circuit Techniques, National Bureau of Standards Project 0602–11–3583, and National Bureau of Standards Report 5139. See also "Preliminary Survey of Electrical Strain Characteristics of Evaporation Films," by Krusky and Parker, February 1957, published by the Office of Scientific Publications, National Bureau of Standards. See also British Patent 689,785.

As for the composition of the material from which the bridge film patterns is formed, such is to be electroconductive with substantial but relatively low order resistance (e.g. on the order of 100–2000 ohms per active segment), and is preferably a semi-conductive material exhibiting a substantial transverse gage factor as well as a substantial parallel gage factor, i.e. a material such as silicon or germanium alloys, and such as certain metallic resinates. As will be understood, many electroconductive materials compositions has a substantial transverse gage factor. The gage factors characteristic of any given electroconductive material can be readily ascertained by test. However, by way of certain typical examples, it was found that a film of an alloy of 25% Si-75% Cr on glass exhibited a $G_p$ of 2.1 and a $G_t$ of $-1.3$. A film of an alloy of 75% Si-25% Cr on glass demonstrated a $G_p$ of 1.5 and a $G_t$ of $-.54$. Some precious metal resinates have proven to be quite satisfactory for purposes of being utilized as the film material according to the present invention; for example palladium resinate marketed under the proprietary term Liquid Bright Palladium #4334 by Hanovia Liquid Gold Division of Engelhard Industries, exhibited a parallel gage factor of about 2.0 and a transverse gage factor of about 0.83. Metallic palladium evaporated onto silicone resin demonstrated a $G_p$ of 0.84 and a $G_t$ of 1.2.

As shown by certain of the above examples it is a characteristic property of certain electroconductive materials that an inverse relation exists between the parallel gage factor $G_p$ and the transverse gage factor $G_t$, i.e. the $G_p$ of the material is a positive factor and the $G_t$ of the material a negative factor. With such a material, placement of the near-edge active segments in the region between the radial stress null zone and the tangential stress null zone results in the radial stress response in the near-edge augmenting the tangential stress response thereof, in that while the stress factors are of opposite sign in this area of (cf. FIG. 1) the gage factors are also of opposite sign with the result that the change in resistance of the segment with change in stress is relatively increased.

As will also be understood, certain adaptations of the principles of the invention can employ only part of the features thereof. Thus, when the film material selected for a particular transducer design has no substantial transverse gage factor, design advantages still pertain to the orientation of the active segment juncture areas at about the radial stress null zone with one or more segments near-center and one or more segments near-edge of the diaphragm, but without especial orientation to utilize segment layout to provide substantial cross segment stresses (such as in the bridge pattern presented by FIGS. 5 and 6 for example). In these types of bridge pattern arrangements, for example, it will be understood that the bridge pattern material can be any electroconductive material with a substantial parallel gage factor, such as Nichrome, manganin or constantin, or can be carbon-loaded paints or electroconductive plastic tape.

In laying the bridge material on one or both sides of the diaphragm, it has been found preferable to use a vacuum vapor deposit technique, since the resulting film is quite uniform in thickness throughout and temperature coefficient characteristics are also quite uniform in all portions of the film.

Any suitable technique can be used for vacuum deposition of the film of electroconductive material onto the diaphragm, such as disclosed in the text entitled "Vacuum Deposition of Thin Films," by L. Holland, publ. by Wiley and Sons (1958), for example.

The thickness of the film can suitably be about 100–500 Angstrom units, for example.

With such electroconductive film coating formed on the surface of the diaphragm, the bridge film pattern can be developed by any of several suitable means, such as by a photo-engraving process wherein the film is first coated with a photo resist, then irradiated with visible or ultra-violet light from the side upon which the pattern is to be developed, through a positive mask of the pattern to be produced on the diaphragm. Such procedure irradiates all portions of the photo resist in the pattern. The exposed diaphragm film is then developed by washing in water or other solution to remove the unexposed photo resist, leaving the resist in the form of the desired pattern on the surface of the diaphragm.

In some instances, in forming the pattern in the deposited film material, the film material can prove rather difficult to remove by conventional electrolytic etching. In such situation, another suitable method of forming the film pattern is that of stylus etching. In this procedure, the film material is connected to the positive side of a battery, and a porous stylus is used, such as for example a chisel-end wood stylus saturated with an electrolyte, with the stylus connected to the negative pole of the battery. The stylus is simply guided over the film material not coated with photo resist to form the pattern by removal of the unwanted material. Alternately, with respect to the pattern formation, a cloth saturated with an electrolyte may be stretched over and spaced somewhat from the film material carrying developed resist. With the film material connected to the positive pole of a battery and with a wire rod connected to the negative pole of the battery, the wire rod is rolled across the cloth and the exposed portions of the film are removed. Any suitable electrolyte may be employed. For example, when the film material is a Si-Cr alloy, a dilute solution of NaOH suffices.

Transducers according to the present invention can be assembled with an internal pressure which is substantially atmospheric, or superatmospheric, as desired, or can be assembled to that the internal chamber pressure is substantially a vacuum.

Figure 12:
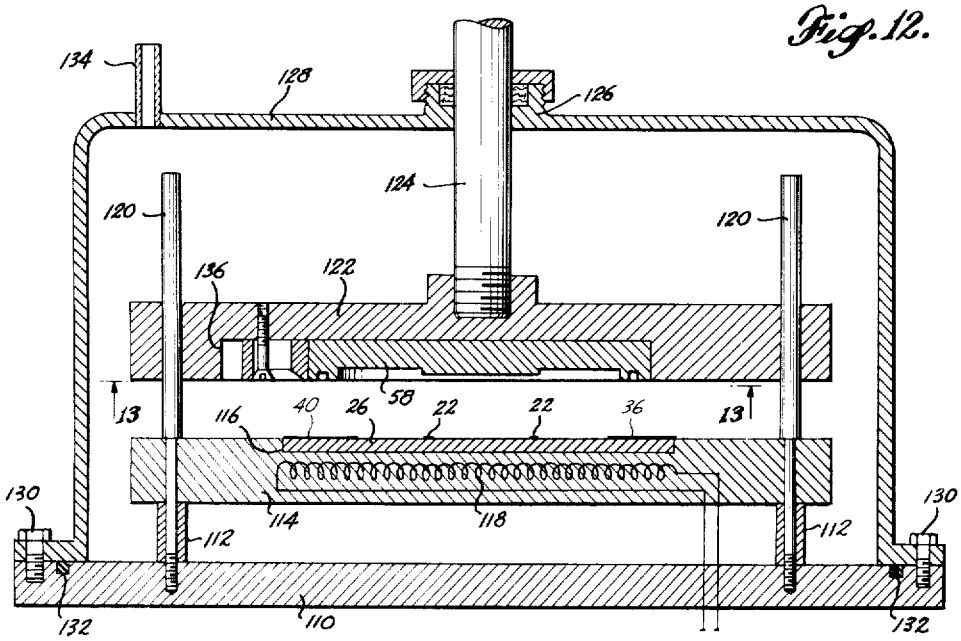
FIG. 12 is a view in vertical cross section illustrating a typical assembly mechanism for fabricating transducer assemblies according to the invention.
Figure 14:
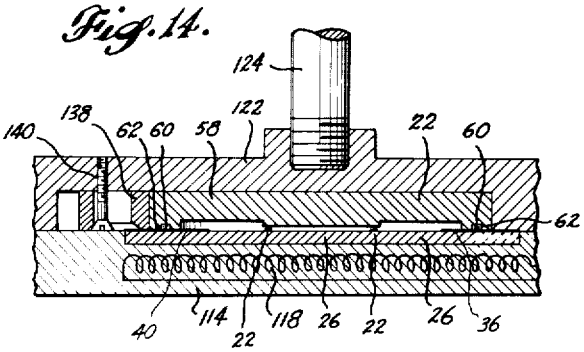
FIG. 14 is a further view of a fragmentary nature of the mechanism shown in FIG. 12, showing the relation of elements with the diaphragm and backing plate assembled.
Figure 13:
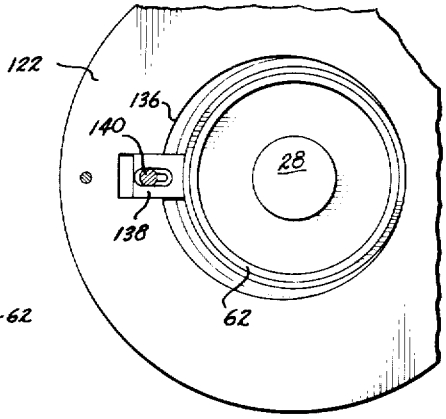
FIG. 13 is a fragmentary view on a somewhat enlarged scale of the mechanism shown in FIG. 12, further illustrating the backing plate clamping arrangement thereof, and taken substantially along line 13—13 thereof.

Typical assembly techniques for transducers according to the present invention, will be considered in connection with FIGS. 12–15. As shown in FIG. 12, the assembly equipment can comprise a base 110 supporting, as by legs 112, a support plate 114 having a cut away portion 116 in its upper face to receive diaphragm 26 after the bridge pattern has been formed thereon. Said support plate 114 is suitably heated in the area of the diaphragm plate, as by an electric heating coil, schematically indicated at 118. Upstanding from support plate 114 are a plurality of guide rods 120 which serve to maintain a reciprocable slide plate 122 parallel to the face of support plate 114. Said slide plate 122 is suitably raised and lowered by means of a press rod 124 threaded therein and passing through stuffing box 126 in cover 128 which in turn is attached as by bolts 130 to base 110. Cover seals 132 are also provided between cover 128 and base 110, and tube 134 permits the pressure inside the cover to be maintained at any desired value while the transducer is being formed. If a vacuum is desired, for example, then the interior of the assembly equipment is maintained evacuated during the assembly procedure.

Slide plate 122 is circularly recessed as at 136 (FIG. 13) to receive the backing plate 28, and a slide block 138 with an adjustment bolt 140 are provided to clamp the backing plate 28 in proper position in slide plate 122.

With the diaphragm 26 and backing plate 58 in proper positions on respective support plates 114 and slide plate 122, the annular groove 62 of the backing plate is filled with a pre-formed adhesive ring 60, the slide plate 122 is placed on guide rods 120, the cover installed, and the desired assembly pressure is established. Then, diaphragm 26 having been placed on and heated by the heating means 118 in the meanwhile, the slide plate 122 is moved down under slight pressure so that firm contact is maintained between diaphragm 26 and backing plate 28 while the adhesive ring 60 in groove 62 sets (cf. FIG. 14). The assembled diaphragm and backing plate are then removed from the assembly equipment, the output leads are soldered to the output connector segments (e.g. in FIG. 2), and the encapsulating ring 64 is applied and cured to complete the transducer assembly.

Figure 15:
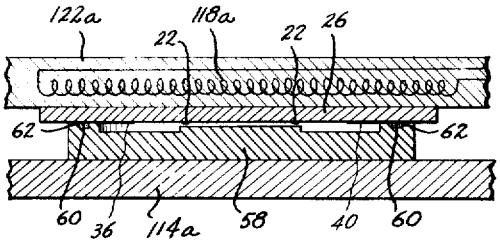
FIG. 15 is a view similar to FIG. 14 of a modified form of assembly mechanism, wherein the backing plate and diaphragm are assembled in reverse positions, as compared with the assembly procedure of FIG. 14.

FIG. 15 illustrates a variation in assembly procedure, suitable for use when the chamber between the diaphragm and the backing plate is not vacuumized. This assembly equipment as shown in FIG. 15, is quite similar to but constructionally simpler than that of FIGS. 12–14. Backing plate 58 is supported on a smooth base plate 114a, with the diaphragm 26 placed thereon after a ring of preformed thermosetting adhesive 60 is placed in groove 62. Then, a smooth surface slide plate 122a, suitably heated as by the electric heating coil 118a, is brought down in pressure contact with the diaphragm 26 and maintained in such position until the ring 60 sets.

From the foregoing discussion of the basic principles governing the present invention, as well as the typical embodiments thereof presented, various other modifications, adaptations and features thereof will occur to those skilled in the art to which the invention is addressed, within the scope of the following claims.

What is claimed is:

1. A pressure responsive device comprising [an edge restrained diaphragm having an] *a diaphragm and means restraining the edge of said diaphragm, said diaphragm having an electrically non-conductive surface to which is bonded an* integral bridge pattern with a plurality of active segments interconnected [at] *by* juncture areas in turn having *connected thereto* relatively low resistance conductor segments [extending beyond the restrained edge of the diaphragm]; said juncture areas lying substantially in the radial stress null zone of the diaphragm, with one active segment connected to each juncture area disposed near-center from said radial stress null zone *of said diaphragm* and the other active segment connected therto disposed near-edge from said radial *stress* null zone *of said diaphragm*.

2. A pressure responsive device according to claim 1, where in a major part of the active segment disposed [outside] *near-edge* of said radial stress null zone is disposed in the area of and [outside] *near-edge with respect to* the tangential stress null zone of said diaphragm.

3. A pressure responsive device according to claim 1, wherein said bridge pattern is composed of a material having a substantial transverse gage factor as well as a substantial parallel gage factor; said near-edge active segment having a substantial part thereof disposed [outside of] *near-edge with respect to* the tangential stress null zone of the diaphragm and extending parallel to the restrained edge thereof, so that the bridge material in substantial part responds to radial stress in relation to its transverse gage factor and in substantial part responds to tangential stress in relation to its parallel gage factor, with such responses augmenting each other.

4. A pressure responsive device according to claim 1, wherein said bridge pattern is composed of a thin, integrally deposited film of electroconductive material.

5. A pressure responsive device according to claim 1, wherein said bridge pattern is composed of a thin, integrally formed film of electroconductive material having a substantial transverse gage factor as well as a substantial parallel gage factor.

6. A pressure responsive device according to claim 5, wherein said film pattern is formed of an electroconductive material having a substantial transverse gage factor, selected from the group consisting of silicon-chrome alloys and metallic resinates.

7. A pressure responsive device according to claim 1, wherein said diaphragm is non-metallic and electrically non-conductive.

8. A pressure responsive device according to claim 7, wherein said diaphragm is fused silica.

9. A pressure responsive device according to claim 1, wherein said diaphragm is metallic and the bridge pattern segments are electrically insulated therefrom.

10. A pressure responsive device comprising a *diaphragm, means restraining the edge of said diaphragm, said* diaphragm having an *electrically non-conductive surface with an* integral bridge pattern bonded thereto, said [pridge] *bridge* pattern arrangement comprising at least one active segment near the center of the diaphragm, substantially entirely in the region thereof where the distance/radius ratio is from about 0.35 to about 0.6, and at least one other active segment disposed substantially entirely in the region where the distance/radius ratio is at least about 0.7.

11. A pressure responsive device comprising a *diaphragm, means restraining the edge of said diaphragm, said* diaphragm having an *electrically non-conductive surface with an* integral bridge pattern bonded thereto, said bridge pattern arrangement comprising at least one active segment near the center of the diaphragm substantially entirely in the region thereof where the distance/radius ratio is from about 0.35 to about 0.60, and at least one other active segment disposed near the edge of said diaphragm, substantially entirely in the region where the distance/radius ratio is at least about 0.7, such latter active segment being predominantly in and [outside of] *near-edge with respect to* the region of said diaphragm where the distance/radius ratio is about 0.9.

12. A pressure responsive device according to claim 11, where in said bridge pattern pattern is composed of an electroconductive material having a substantial transverse gage factor as well as a substantial parallel gage factor.

13. A pressure responsive device according to claim 12, wherein said diaphragm is fused silica.

14. A pressure responsive device according to claim 13, wherein said electroconductive material is an integrally deposited film of semi-conductor material.

15. [In a] *A* pressure responsive device comprising a diaphragm *with means restraining the edge thereof and with an electrically non-conductive surface* having bonded thereto a strain sensitive bridge pattern with active segments consisting of an integrally formed electroconductive material having a substantial transverse gage factor as well as a [longitudinal] *parallel* gage factor, said bridge pattern having active segments arranged on said diaphragm to be substantially responsive to strain both perpendicular and parallel to the direction of current flow therein.

16. A pressure responsive device according to claim 15, wherein at least one of said bridge pattern active segments is arranged to provide that at least 20% of the total change of resistance thereof occurs from responsive to strain perpendicular to the direction of current flow.

17. A pressure responsive device according to claim 15, wherein the bridge pattern is comprised to a vacuum deposited film of electroconductive material having a substantial transverse gage factor.

18. A pressure responsive device according to claim 17, wherein said film pattern is formed of an electroconductive material having a substantial transverse gage factor, selected from the group consisting of silicon-chrome alloys and metallic resinates.

19. A pressure responsive device according to claim 15, wherein said diaphragm is a fused silica wafer.

20. [In a] *A* wafer type pressure responsive device comprising [an edge clamped diaphragm] *a diaphragm, means restraining the edge of said diaphragm, the said diaphragm having an electrically non-conductive surface* with an integral film pattern bonded [to said diaphragm] *thereto* edge-to-edge [and in essentially quadrant arrangement], *of the diaphragm,* said film pattern having two diametrically opposite active film segments disposed symmetrically near the center of said diaphragm, and two other diametrically opposite active film segments disposed near the [clamped] *restrained* edge of said diaphragm, said active film segments terminating in juncture areas substantially at the radial stress null zone of the diaphragm, the thickness of all such active film segments being substantially the same and the length/width ratio of each film segment being substantially equal to the length/width ratio of the other active film segments so as to be internally balanced resistively and so as to be internally temperature compensated, and all of such resistor film segments being spaced substantially one from another so as to minimize heating effects.

21. A pressure responsive device according to claim 20, wherein said active film segments are composed of an electroconductive material having a substantial transverse gage factor as well as a parallel gage factor, and the active film segments near the center of the diaphragm extend at least primarily circumferentially thereof to longitudinally receive tangential diaphragm stress and transversely receive radial diaphragm stress, the active film segments situated near the [clamped] *restrained* edge of the diaphragm being arranged in a pattern with substantial components thereof extending both tangentially and radially to be sensitive to both tangential and radial stress.

22. A pressure responsive device according to claim 21, wherein said film pattern is formed of an electroconductive material having a substantial transverse gage factor, selected from the group consisting of silicon-chrome alloys and metallic resinates.

23. A pressure responsive device according to claim 20, wherein said diaphragm is a fused silica wafer.

24. A [wafer type] pressure responsive assembly, comprising a pressure sensitive diaphragm *having an electrically non-conductive surface,* and an electro-conductive film pattern on said [diaphragm] *surface,* with at least one active segment situated near-center of said diaphragm, and at least one active segment situated near-edge of said diaphragm and with relatively low resistance conductor segments integral with and extending from juncture areas [as] *at* the ends of said active segments [to the periphery of said diaphragm], *the* said assembly further comprising a backing plate annularly bonded to said diaphragm *only* near the periphery of said diaphragm, [, said backing plate being overlapped by portions of said conductor film segments].

25. An assembly according to claim 24, wherein said backing plate is substantially more rigid than said diaphragm.

26. An assembly according to claim 24, wherein said diaphragm and said backing plate are formed of the same material.

27. An assembly according to claim 24, wherein said diaphragm and said backing plate are of substantially the same thickness and consequently have similar flexural characteristics, the flexure of the backing plate thus augmenting the pressure responsive flexural characteristics of said diaphragm.

28. An assembly according to claim 27, wherein said diaphragm and said backing plate are fused silica.

29. An assembly according to claim 27, wherein said diaphragm and said backing plate are metal.

30. A [wafer type] pressure responsive assembly, comprising a pressure sensitive diaphragm *an electrically non-conductive surface on said diaphragm,* and an integrally formed electroconductive film pattern on said [diaphragm] *surface* with at least one active segment situated near-center of said diaphragm and at least one active segment situated near-edge of said diaphragm, and with relatively low resistance conductor segments integral with and extending from juncture areas at the ends of said active segments to the periphery of said diaphragm, said assembly further comprising a backing plate annularly *connected to said diaphragm only near the periphery of said diaphragm,* with said conductor film segments overlapping said backing plate, and conductor output leads connected to said output conductor segments externally of said backing plate at about the peripheral edges of said diaphragm.

31. A [wafer type] pressure responsive assembly, comprising a pressure sensitive diaphragm, *an electrically non-conductive surface on said diaphragm* and an electroconductive film pattern on said *surface* [diaphragm], said film pattern comprising at least one active segment situated near-center of said diaphragm and at least one active segment situated near-edge of said diaphragm, such pattern further comprising relatively low resistance conductor segments integral with and extending from juncture areas at the ends of said active segments to the periphery of said diaphragm, a backing plate bonded to said diaphragm *only* near the edge thereof and contacting portions of said conductor film segments, conductor output leads connected to said output conductor segments externally of said backing plate at about the peripheral edges of said diaphragm, and bonding means between the periphery of said diaphragm and the outer portion of said backing plate retaining the same together and encapsulating the connections between said film conductor segments and said output leads.

32. An assembly according to claim 31, wherein said backing plate is substantially more rigid than said diaphragm.

33. An assembly according to claim 31, wherein said diaphragm and said backing plate are formed of the same material.

34. An assembly according to claim 31, wherein said diaphragm and said backing plate are of substantially the same thickness and have similar flexural characteristics, the flexure of the backing plate thus augmenting the pressure responsive flexural characteristics of said diaphragm.

35. An assembly according to claim 34, wherein said diaphragm and said backing plate are fused silica.

36. An assembly according to claim 34, wherein said diaphragm and said backing plate are thin metal.

37. A [wafer type] pressure responsive assembly, comprising a pressure sensitive diaphragm *having an electrically non-conductive surface,* and an electroconductive bridge pattern on said *surface* [diaphragm], said bridge pattern comprising an integral film with at least one active segment situated near-center of said diaphragm and at least one active film segment situated near-edge of said diaphragm, and with relatively low resistance conductor segments integrally extending from about the radial stress null zone of said diaphragm to the periphery thereof, said assembly further comprising a backing plate bonded to said diaphragm and to said conductor segments *only* near the outer edge of said diaphragm.

38. A [wafer type] pressure responsive assembly, comprising a pressure sensitive diaphragm *having an electrically non-conductive surface,* and an electroconductive bridge pattern on said *surface* [diaphragm], said bridge pattern comprising an intergral film with at least one active segment situated near-center of said diaphragm and at least one active film segment situated near-edge of said *diaphragm* [diaphragm], and with relatively low resistance conductor segments integrally extending from about the radial stress null zone of said diaphragm to the periphery thereof, a backing plate bonded to said diaphragm and said conductor segments *only* near the outer extent thereof, conductor output leads connected to said output conductor segments externally of said backing plate at about the peripheral edge of said diaphragm, and thermosetting bonding means between the periphery of said diaphragm and the outer portion of said backing plate retaining the same together and encapsulating the connections between said conductor segments and said output leads.

39. A strain sensitive [wafer type] pressure transducer assembly, comprising a flexible diaphragm *having at least one electrically non-conductive surface,* and an integrally deposited film pattern on *said* at least one surface of said diaphragm, said film pattern comprising two oppositely disposed active film segments situated within the radial stress null zone of said diaphragm and two oppositely disposed active film segments situated at least primarily in the area of the tangential stress null zone of said diaphragm, such film pattern further comprising relatively low resistance output conductor film segments connecting with said active film segments in about the said radial stress null zone and extending outwardly therefrom to the periphery of said diaphragm, a backing plate bonded to said diaphragm and said conductor film segments *only* near the outer extent thereof, conductor outputs leads connected to said output conductor segments externally of said backing plate at about the peripheral edges of said diaphragm, and thermosetting bonding means between the periphery of said diaphragm and the outer portion of said backing plate retaining the same together and encapsulating the connections between said conductor film segments and said output leads.

40. [in a] A wafer type pressure responsive device comprising [an edge clamped] a *flexible* diaphragm with *means restraining the edge thereof, said diaphragm having an electrically non-conductive surfaces and* an integrally formed film pattern bonded to send [diaphragm] *surface substantially* edge-to-edge *of the diaphragm* [and in essentially quadrant arrangement], said film pattern having at least one active segment disposed inside the radial stress null zone of said diaphragm and at least one active film segment disposed outside the radial stress null zone of said diaphragm, the thickness and length/width ratio of the active film segments being substantially equal, and the active film segments being spaced substantially one from another so as to minimize heating effects.

41. A transducer comprising a circular flexible diaphragm *with an electrically non-conductive surface,* means to [clamp] *restrain* said diaphragm near its peripheral edge, a bridge pattern including two pairs of active resistor segments bonded to said *surface* [diaphragm], the resistor segments of a first pair being positioned on the *said* surface of said diaphragm near the [clamped] *restrained* edge *of said diaphragm* [thereof], the net stress in the diaphragm at said first pair of resistor segments upon imposition of a uniform load being of net positive value, said first pair of resistor segments being symmetrically and oppositely arranged on the diaphragm, the resistor segments of the second pair of segments being positioned adjacent to the center of the diaphragm, the net stress in the diaphragm in the area of said second pair of resistor segments being of negative value, said second pair of resistor segments also being symmetrically and oppositely arranged on said diaphragm, said bridge pattern further comprising junction areas interconnecting adjacent resistor segment ends, said juncture areas at least in part being in a region of the diaphragm where the factor *r/a minus the factor*

$$\left[\frac{m+1}{3m+1}\right]^{1/2}$$

substantially equals zero, *"r/a" being the distance "r" of said region from the center of the diaphragm divided by the radius "a" of the diaphragm from the center to the restrained portion thereof, and* "m" being the reciprocals of the Poisson's ratio of the diaphragm material.

*42. A pressure responsive device comprising a pressure sensitive diaphragm with means restraining the edge thereof, said diaphragm having an electrically non-conductive surface and a bridge pattern on said surface, said bridge pattern comprising at least two active segments terminating substantially in the radial stress null zone of the diaphragm, with one such active segment disposed near-center from the radial stress null zone of the diaphragm and the other such active segment disposed near-edge from the radial stress null zone of the diaphragm.*

*43. A pressure responsive device comprising a pressure sensitive diaphragm with means restraining the edge thereof, said diaphragm having an electrically non-conductive surface and an integral bridge pattern on said surface, said bridge pattern comprising at least two active segments interconnetced at a juncture area lying substantially in the radial stress null zone of the diaphragm, with one such active segment connected to said juncture area disposed near-center from the radial stress null zone of the diaphragm and the other such active segment connected to said juncture area disposed near-edge from the radial stress null zone of the diaphragm.*

*44. A pressure responsive transducer comprising a flexible diaphragm with means restraining the edge thereof and with an electrically non-conductive surface having bonded thereon a bridge pattern comprising a plurality of active segments terminating at juncture areas, said pattern being arranged so that each of said juncture areas lies substantially in the radial stress null zone of the diaphragm, with one such active segment being disposed near-center from the radial stress null zone of the diaphragm and the other active segment being disposed near-edge from the radial stress null zone, of the diaphragm such near-edge active segment being disposed with a major part thereof in the area of and near-edge with respect to the tangential stress null zone of said diaphragm.*

*45. A pressure responsive transducer comprising a flexible diaphragm with means restraining the edge thereof and with an electrically non-conductive surface having thereon a bonded bridge pattern in the form of an integral film, said bridge pattern comprising a plurality of active segments interconnected at juncture areas, said pattern being arranged so that each of said juncture areas lies substantially in the radial stress null zone of the diaphragm, with one active segment connected to each such juncture areas being disposed near-center from the radial stress null zone of the diaphragm and the other active segment connected to each such juncture area being disposed near-edge from the radial stress null zone of the diaphragm, such near-edge active segment being disposed with a major part thereof in the area of and near-edge with respect to the tangential stress null zone of said diaphragm.*

*46. A pressure responsive device comprising a diaphragm with means restraining the edge thereof and with an electrically non-conductive surface having bonded thereto a bridge pattern comprising at least one active segment near the center of the diaphragm and disposed*

*substantially entirely in the region thereof where the distance/radius ratio is less than about 0.6, and further comprising at least one other active segment disposed substantially entirely in the region of the diaphragm where the distance/radius ratio is at least about 0.7.*

*47. A pressure responsive device comprising a diaphragm with means restraining the edge thereof and with an electrically non-conductive surface having an integral bridge pattern bonded thereto, said bridge pattern arrangement comprising at least one active segment near the center of the diaphragm substantially entirely in the region thereof where the distance/radius ratio is less than about 0.6, and at least one other active segment disposed substantially entirely in the region of the diaphragm where the distance/radius ratio is at least about 0.7.*

*48. A pressure sensitive transducer comprising a circular flexible diaphragm with means restraining the edge thereof and with an electrically non-conductive surface, a bridge pattern including a plurality of active resistor segments bonded to said surface, of which a first resistor segment is positioned on the said surface near the edge of said diaphragm, the net stress in the diaphragm in the area of said first resistor segment upon imposition of a uniform load being of net positive value, a second resistor segment positioned on said surface adjacent to the center of the diaphragm, the net stress in the diaphragm in the area of said second resistor segment being of negative value upon such uniform loading, said bridge pattern further comprising a juncture area interconnecting adjacent ends of said first and second resistor segments, said juncture area at least in part being in a region of the diaphragm where the factor r/a minus the factor*

$$\left[\frac{m+1}{3m+1}\right]^{1/2}$$

*substantially equals zero, where "r/a" is the distance "r" of said region from the center of the diaphragm divided by the radius "a" of the diaphragm, and "m" is the reciprocal of the Poisson's ratio of the diaphragm material.*

*49. A flexible circular diaphragm adapted to act as a transduction means in a transducer, comprising a circular flexible diaphragm rigidly restrained at its peripheral edge only, an electrically non-conductive surface on said diaphragm, and a film pattern bonded to said surface, said film pattern including at least a pair of active segments, one of said active segments being positioned entirely in and having terminal ends positioned in the area of said diaphragm at a radial distance equivalent to an r/a value substantially greater than about 0.6, and another of said active elements being positioned entirely in and having terminal ends positioned in the area of the diaphragm at a radial distance equivalent to an r/a value substantially less than about 0.6, the said active segments being separated from each other by a radial distance difference extending a substantial distance both sides of a radial distance equivalent to an r/a value of about 0.6 where "a" is the radius of said circular diaphragm and "r" is the above stated radial distance, and relatively low electrical resistance juncture films bonded to such diaphragm surface, one of said juncture films being connected to one of the terminal ends of each of the active segments of said pair.*

*50. A transduction element for a transducer comprising a circular diaphragm rigidly restrained at its peripheral edge only, means to apply a load to said diaphragm to deflect said diaphragm, an electrically non-conductive surface on said diaphragm, and a film pattern bonded to said surface, said pattern including at least a pair of active segments, one of said active segments being positioned entirely in the area of said diaphragm at a radial distance equivalent to an r/a value greater than about 0.6, and the other of said active segments being positioned entirely in the area of said diaphragm at a radial distance equivalent to an r/a value substantially less than about 0.6, with one of the said active segments being separated from the other of said active segments by a substantial radial distance difference, a plurality of juncture elements bonded to said diaphragm and interconnecting said active segments, with each of said juncture elements extending a substantial distance across a radial distance equivalent to an r/a value of about 0.6 and a substantial distance to either side of said last named radial distance, said juncture elements having a relatively low electrical resistance as compared with the electrical resistance of said active segments, and electrical connectors connected to each of said juncture elements, where "a" is a radius of the diaphragm and "r" is said radial distances.*

*51. A transduction element for a transducer comprising a flexible circular diaphragm rigidly restrained at its peripheral edge only, an electrically non-conductive surface on said diaphragm, and a film pattern bonded to said surface, said pattern including at least two pairs of active segments, the active segments of one of said pairs being separated from each other and being positioned entirely in the area of said diaphragm at a radial distance equivalent to an r/a value substantially greater than about 0.6, said active segments terminating at a radial distance equivalent to an r/a value substantially greater than about 0.6, and the active segments of the other of said pairs being separated from each other and being positioned entirely in the area of the diaphragm at a radial distance substantially less than that equivalent to an r/a value of about 0.6, said last named active segments terminating at a radial distance equivalent to an r/a value of substantially less than about 0.6, the said active segments of one of said pairs being separated from the active segments of the other of said pairs, and the ends of the segments of one of said pairs being separated from the ends of the other active segments of the other of said pairs by a radial distance difference extending a substantial radial distance both sides of a radial distance equivalent to an r/a value of about 0.6, where "a" is the radius of the diaphragm and "r" is the above radial distances, each such end of said active segments of one of said pairs being connected to an associated terminal end of an active segment of the other of said pairs by a junction film bonded to said diaphragm, each said junction film having a relatively low electrical resistance compared to the resistance of said active segments and electrically connecting said active segments in a bridge configuration, with said active segments being otherwise electrically insulated from each other except at such junctions.*

References Cited by the Examiner

The following references, cited by the Examiner, are of record in the patented file of this patent or the original patent.

UNITED STATES PATENTS

| | | | |
|---|---|---|---|
| 2,318,102 | 5/1943 | Ruge | 338—2 |
| 2,848,892 | 8/1958 | Hoffman | 73—141 |
| 3,049,685 | 8/1962 | Wright | 73—88.5 X |
| 3,079,576 | 2/1963 | Kooiman | 338—4 |
| 3,122,717 | 2/1964 | Motsinger | 338—4 |

ANTHONY BARTIS, *Acting Primary Examiner.*

RICHARD M. WOOD, *Examiner.*

W. D. BROOKS, *Assistant Examiner.*